US007029056B2

(12) United States Patent
Browne et al.

(10) Patent No.: US 7,029,056 B2
(45) Date of Patent: Apr. 18, 2006

(54) CLOSURE LOCKDOWN ASSEMBLIES AND METHODS UTILIZING ACTIVE MATERIALS

(75) Inventors: Alan L. Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 36 days.

(21) Appl. No.: 10/864,783

(22) Filed: Jun. 9, 2004

(65) Prior Publication Data

US 2005/0275243 A1 Dec. 15, 2005

(51) Int. Cl.
*B60J 5/00* (2006.01)

(52) U.S. Cl. ....................... 296/146.9; 70/237; 70/240; 292/DIG. 14; 292/DIG. 23; 292/DIG. 42; 292/DIG. 43

(58) Field of Classification Search ............. 296/146.1, 296/146.4, 146.9; 70/237, 240, 238, 241, 70/266; 297/1, DIG. 3, DIG. 4, DIG. 5, 297/DIG. 14, DIG. 23, DIG. 42, DIG. 43, 297/DIG. 67

See application file for complete search history.

(56) References Cited

U.S. PATENT DOCUMENTS 4,702,094 A 10/1987 Peterson
5,725,928 A 3/1998 Kenney et al.
5,918,915 A * 7/1999 Calteux ......................... 292/1
6,086,599 A 7/2000 Lee et al.
6,428,080 B1 8/2002 Ochoa
6,871,519 B1 * 3/2005 Butera et al. ................. 70/256
2002/0007884 A1 1/2002 Schuster et al.
2005/0046200 A1 * 3/2005 Dominique ................. 292/216
2005/0146147 A1 * 7/2005 Niskanen et al. ........ 292/336.3

FOREIGN PATENT DOCUMENTS

JP 2002067461 A * 3/2002
WO WO 01/84002 A2 11/2002

* cited by examiner

*Primary Examiner*—Jason Morrow
(74) *Attorney, Agent, or Firm*—Kathryn A. Marra

(57) ABSTRACT

In combination with a vehicle and a closure, one or more lockdown regions disposed between the closure and the vehicle body, the one or more lockdown includes a device including an active material disposed in operative communication with the closure and the vehicle body, wherein the active material includes a shape memory alloy, a magnetic shape memory material, a shape memory polymer, a magnetorheological fluid, an electroactive polymer, a magnetorheological elastomer, an electrorheological fluid, a piezoelectric material, or combinations comprising at least one of the foregoing active materials; and an activation device coupled to the active material, the activation device being operable to selectively provide an activation signal to the active material and effectuate a change in a dimension, a shape, and/or a flexural modulus property of the active material, wherein the change in the dimension, a shape, and/or flexural modulus of the active material locks down or releases the closure from the vehicle. Such active materials include shape memory alloys, magnetic shape memory alloys, electroactive polymers, shape memory polymers, magnetorheological fluids, magnetorheological elastomers, electrorheological fluids, and piezoelectric materials. Also provided herein are methods for selectively stiffening a closure hingeably attached to a vehicle body.

22 Claims, 3 Drawing Sheets

CLOSURE LOCKDOWN ASSEMBLIES AND METHODS UTILIZING ACTIVE MATERIALS

BACKGROUND

The present disclosure generally relates to closure lockdown assemblies for use in an automotive vehicle, wherein the closure lockdown assemblies include the use of active materials for reversible on-demand lockdown of the closure to the vehicle.

Most motor vehicles employ one or more hingeable closures, an example being a hood or bonnet, which is disposed in a region between the passenger compartment and the forward bumper of the motor vehicle, or a trunk lid or boot, which is between the passenger compartment and the rearward bumper of the motor vehicle, or a door for entering and exiting the vehicle, among other closures. The hingeable closures generally provide a mechanism for accessing the underlying compartment such as an engine or storage compartment and/or for permitting entry and exit of an occupant or object from the vehicle. Focusing on the vehicle hood, it is typically formed of a relatively thin sheet of metal or plastic that is molded to the appropriate contour corresponding to the overall vehicle body design. The exterior of the hood portion, which constitutes the show surface thereof, is typically coated with one or more coats of primer and paint for enhancing both the aesthetic character and the corrosion resistance of the underlying material. Due to the relatively thin nature of the material forming the hood portion, a support structure such as a contoured plate with stamped rib supports typically extends across the underside of the hood portion so as to provide a degree of dimensional stability to the structure.

Vehicle closure latch systems are primarily used for locking down the closure generally at single discrete point opposite the pivot point of the closure. The latch system typically includes a striker on the closure, a primary latching member on the vehicle body engageable with the striker to hold the pivotable closure in the closed position, and a secondary latching member on the vehicle body in the path taken by the striker from the latched condition. The secondary latching member acts as a redundant safety device to prevent the closure from opening in the event that the primary latching member might disengage during service, such as may be desired for vehicle hoods.

In the case of hoods and trunk lids, very often the primary latching member is cable-operated from inside the vehicle. The secondary latching member is directly operated (e.g. by a handle). The secondary latching member usually has an actuating handle that is accessible to a person's fingers when the person is standing in front of the vehicle. The actuating handle must be pushed or pulled in a specific direction in order to release the secondary latching member from the striker.

Since the latch system is disposed at a single discrete point and is static in its design, the current system is not adaptable to changing conditions. For example, it would be desirable to have a closure lockdown mechanism that can alter load paths or provide energy absorption properties such as may be beneficial during an impact event. Moreover, it is desirable to have a plurality of lockdown attachments of the hood to the vehicle body so as to provide complete securement about the perimeter of the hood to the vehicle. These comments in general hold true for most other types of vehicle closures, e.g., lift gates, tail gates, sunroofs, doors, trunks, hoods, and the like.

BRIEF SUMMARY

Disclosed herein are closure lockdown assemblies and methods utilizing active materials. In one embodiment, in combination with a vehicle and a closure, one or more lockdown regions are disposed between the closure and the vehicle body. The one or more lockdown regions comprise a device comprising an active material disposed in operative communication with the closure and the vehicle body, wherein the active material comprises a shape memory alloy, a shape memory polymer, a magnetic shape memory alloy, a magnetorheological fluid, an electroactive polymer, a magnetorheological elastomer, an electrorheological fluid, a piezoelectric material, or combinations comprising at least one of the foregoing active materials; and an activation device coupled to the active material, the activation device being operable to selectively provide an activation signal to the active material and effectuate a change in a shape, a dimension, and/or flexural modulus property (or shear, if a liquid) of the active material, wherein the change in the shape, dimension, and/or flexural modulus of the active material locks down or releases the closure from the vehicle.

In another embodiment, a reversible lockdown system for a closure hingeably attached to a vehicle body comprises a sensor that generates a signal based on pre-impact or impact information; a controller disposed to receive the sensor signal and deliver an activation signal to at least one device in operative communication with the closure and the vehicle body, wherein the at least one device comprises comprising an active material disposed in operative communication with the closure and the vehicle body, wherein the active material comprises a shape memory alloy, a shape memory polymer, a magnetic shape memory alloy, a magnetorheological fluid, an electroactive polymer, a magnetorheological elastomer, an electrorheological fluid, a piezoelectric material, or combinations comprising at least one of the foregoing active materials, and wherein the activation signal effectuates a change in a shape, dimension, and/or flexural modulus property (or shear, if a liquid) of the active material, wherein the change in the shape, dimension, and/or flexural modulus of the active material locks down or releases the closure from the vehicle.

A method for selectively stiffening a closure hingeably attached to a vehicle body, the method comprises generating an activation signal; and activating at least one device in response to the activation signal, wherein the device comprises an active material in operable communication with a closure and vehicle body, wherein the active material changes a shape, dimension, or flexural modulus property (or shear, if a liquid) of the active material upon receipt of the activation signal and stiffens an interface between the closure and the vehicle body.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
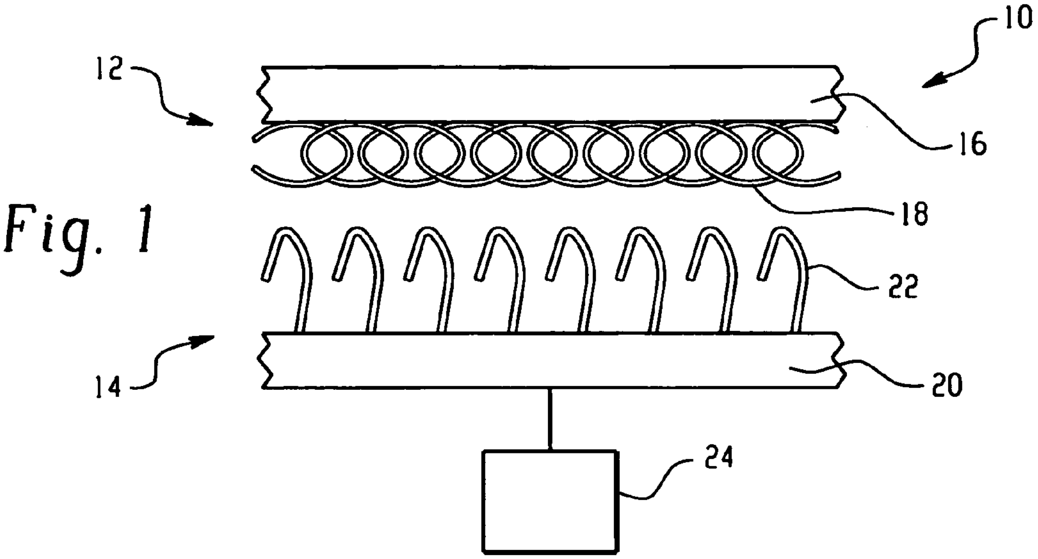
FIG. 1 is a cross sectional view of a releasable fastening system.

Methods, devices, and closure lockdown assemblies employing active materials for reversible on-demand lockdown of a vehicle closure are disclosed herein. The closure lockdown assemblies can be configured to provide a single discrete attachment means of the closure to the vehicle body or may be configured to provide a plurality of attachment points as will be described. The active material provides a means for reversible on-demand lockdown of the vehicle closure. As used herein, the term "closure" generally refers to lids covering the engine or trunk areas as well as to vehicle doors for entry into and out of the vehicle, tailgates, lift gates, sunroofs, and the like. The term "active material" as used herein generally refers to those materials that exhibit a change in stiffness, dimension, shape, or shear force upon application of an activation signal. Suitable active materials include, without limitation, shape memory alloys (SMA), magnetic shape memory alloys, shape memory polymers (SMP), piezoelectric materials, electroactive polymers (EAP), magnetorheological fluids and elastomers (MR), and electrorheological fluids (ER). Depending on the particular active material, the activation signal can take the form of an electric field, a temperature change, a magnetic field, or a mechanical loading or stressing.

In one embodiment, the method generally comprises activating the active material to provide lockdown of the closure. In this embodiment, it is preferred that the lockdown be powered. In this manner, lockdown can be maintained during operation of the vehicle. Upon shutdown of the vehicle, the active material would no longer be powered and the lockdown would be reversed. Consequently, the conventional latch assembly would maintain the closure in a locked position absent release of the latch, e.g., hood, trunk, door, tailgate, liftgate, sunroof, and the like.

In another embodiment, the method generally includes sensing an impact, generating a signal, and activating the active material upon receipt of the signal, which is in operative communication with the closure. Alternatively, the lockdown assembly is manually activated to provide the activating signal to the active material and provide the reversible on-demand lockdown. Advantageously, the active material, in operative communication with the closure, e.g., hood, can be configured to increase the energy absorbing capabilities of the closure by altering impact load paths such as, for example, by selectively increasing vehicle hood component stiffness through lockdown and/or release of stored energy in the hood.

In one embodiment, the active material reversibly changes it shape, dimension, or flexural modulus property (or shear, if the active material is liquid) to releasably effect lockdown of the vehicle hood in response to the activation signal. A device or actuator contains the active material, wherein the active material has a first shape, dimension, or stiffness and is operative to change to a second shape, dimension, stiffness, and/or provide a change in closure release strength in response to the activation signal. The device is designed to be installed in operative communication with the closure. Optionally, the entire closure or portions thereof could be formed of the active material.

The device or actuator can take many forms depending on the active material. For example, the device or actuator can be comprised of shape memory alloy springs, piezoelectric ceramic patches, ferromagnetic or magnetorheological fluid containing rubber seals, electroactive polymer seals, and the like. An exemplary device is shown in FIG. 1. There, the device generally indicated as 10, comprises a loop portion 12 and a hook portion 14. One portion is selected to be attached to the vehicle body, the other portion selected to be attached to the closure. The loop portion 12 includes a support 16 and a loop material 18 disposed on one side thereof whereas the hook portion 14 includes a support 20 and a plurality of closely spaced upstanding hook elements 22 extending from one side thereof. The hook elements 22 are formed of a suitable active material that provides a shape changing capability and/or a change in flexural modulus properties to the hook elements 22.

Preferably, the active materials employed have configurations that are resilient and flexible in addition to providing shape changing capabilities and/or changes in the flexural modulus properties. Coupled to and in operative communication with the exemplary hook elements 22 is an activation device 24. The activation device 24, on demand, provides a suitable activation signal to the hook elements 22 to change the shape, dimension, and/or flexural modulus of the hook element 22. The activation signal provided by activation device 24 for changing the shape, dimension, and/or flexural modulus of the hook elements 22 may include a heat signal, a magnetic signal, an electrical signal, a pneumatic signal, a mechanical activation signal, combinations comprising at least one of the foregoing signals and the like, the particular activation signal depending on the materials and/or configuration of the hook elements 22. For example, a magnetic and/or electrical signal could be employed for changing the shape of hook elements fabricated from magnetostrictive materials. Heat signals could be employed for causing a shape change in hook elements fabricated from shape memory alloys or shape memory polymers. Electrical signals could be employed for causing a shape change in hook elements fabricated from electroactive materials, piezoelectrics, electrostatics, and ionic polymer metal composite materials.

The change in shape, dimension, and/or flexural modulus property generally remains for the duration of the applied activation signal. Upon discontinuation of the activation signal, the hook elements 22 revert substantially to a relaxed or unpowered shape. A biasing spring element may be employed in some embodiments to provide a return mechanism. The device 10 is exemplary only and is not intended to be limited to any particular shape, size, configuration, number or shape of hook elements 22, shape of loop material 18, or the like.

During engagement, such as when the closure is in the closed position, the two portions 12, 14 contact each other to create a joint that is relatively strong in shear and pull-off directions, and weak in a peel direction. For example, when the two portions 12, 14 are pressed into face-to-face engagement, the hook elements 22 become engaged with the loop material 18 and the close spacing of the hook elements 22 resists substantial lateral movement when subjected to shearing forces in the plane of engagement. Similarly, when the engaged joint is subjected to a force perpendicular to this plane, (i.e., pull-off forces), the hook elements 22 resist substantial separation of the two portions 12, 14. However, when the hook elements 22 are subjected to a peeling force, the hook elements 22 can become disengaged from the loop material 18.

Figure 2:
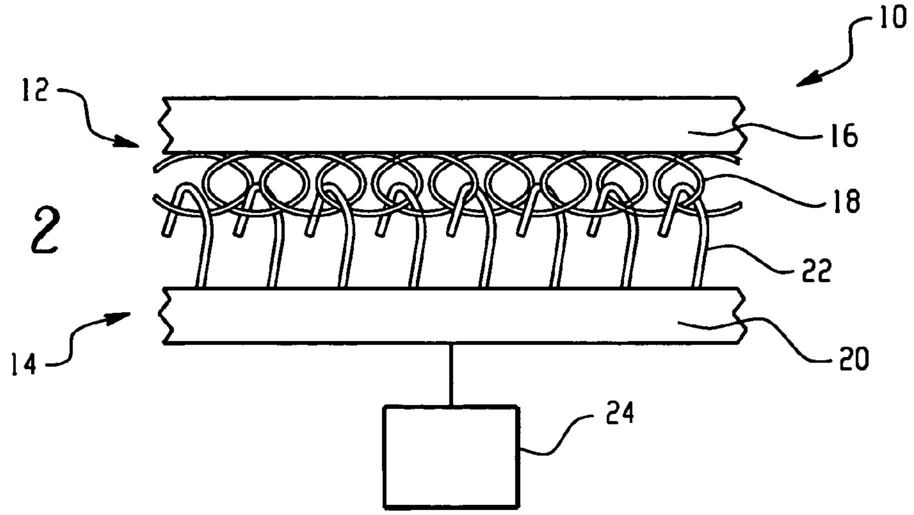
FIG. 2 is a cross sectional view of the releasable fastening system of FIG. 1, wherein the releasable fastening system is engaged.
Figure 3:
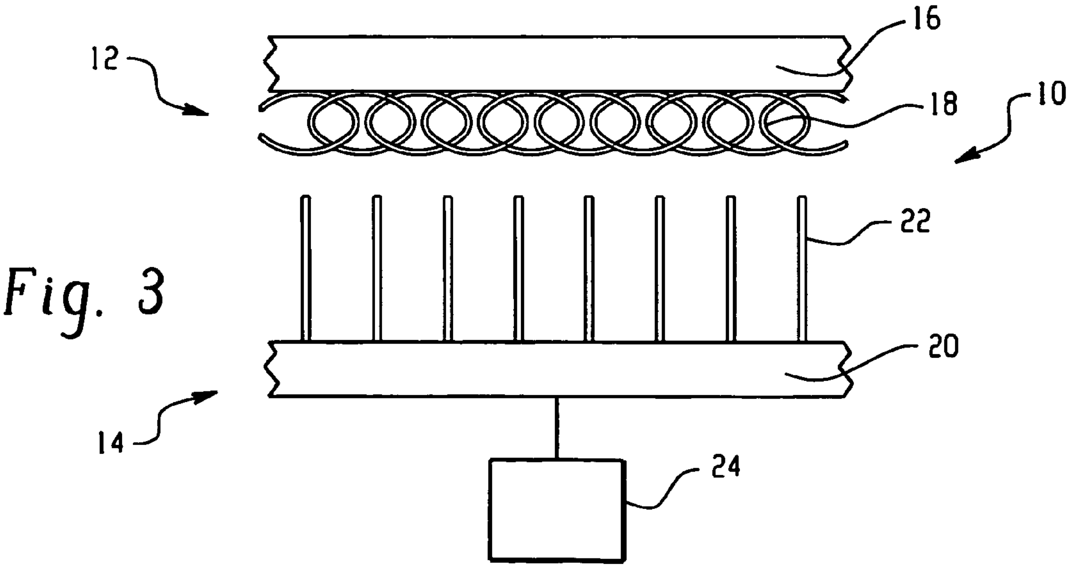
FIG. 3 is a cross sectional view of the releasable fastening system of FIG. 1, wherein the releasable fastening system is disengaged.

To reduce shear and pull-off forces resulting from the engagement, the shape, dimension, and/or flexural modulus of the hook elements 22 is altered upon receipt of the activation signal from the activation device 24 to provide a remote releasing mechanism of the engaged joint. As a result of changing the shape, dimension, and/or flexural modulus of the hook elements 22, a marked reduction in shear and pull off forces is observed, thereby allowing the joint to separate in directions normally associated with pull-off and shear. That is, the change in shape, dimension, and/or flexural modulus reduces the shearing forces in the plane of engagement, and reduces the pull off forces perpendicular to the plane of engagement. For example, as shown in FIGS. 2 and 3, the plurality of hook elements 22 can have inverted J-shaped orientations that are changed, upon demand, to substantially straightened shape orientation upon receiving an activation signal from the activation device 24. The substantially straightened shape relative to the J-shaped orientation provides the joint with marked reductions in shear and pull-off forces. Similarly, a reduction in shear and pull off forces can be observed by changing the flexural modulus of the hook elements. The change in flexural modulus properties can be made individually, or in combination with the shape change. For example, changing the flexural modulus properties of the hook elements to provide an increase in flexibility will reduce the shear and pull-off forces. Conversely, changing the flexural modulus properties of the hook elements to decrease flexibility (i.e., increase stiffness) can be used to increase the shear and pull-off forces when engaged. That is, the holding force is increased thereby providing a stronger joint.

The hook elements 22 may be formed integrally with support 20, or more preferably, may be disposed on the support 20. In practice, spacing between adjacent hook elements 22 is an amount effective to provide sufficient shear and pull off resistance desired for the particular application during engagement with the loop material 18. Depending on the desired application, the amount of shear and pull-off force required for effective engagement can vary significantly. Generally, the closer the spacing and the greater number of hook elements that are employed will result in greater shear and pull off forces for disengagement. The hook elements 22 preferably have a shape configured to become engaged with the loop material 18 upon pressing contact of the loop portion 12 with the hook portion 14, and vice versa. In this engaged mode, the hook elements 22 can have an inverted J-shaped orientation, a mushroom shape, a knob shape, a multi-tined anchor, T-shape, spirals, or any other mechanical form of a hook-like element used for separable hook and loop fasteners. Such elements are referred to herein as “hook-like”, “hook-type”, or “hook” elements whether or not they are in the shape of a hook. Likewise, the loop material may comprise a plurality of loops or pile, a shape complementary to the hook element (e.g., a key and lock type engagement), or any other mechanical form of a loop-like element used for separable hook and loop fasteners.

The loop material 18 generally comprises a random looped pattern or pile of a material. The loop material is often referred to as the “soft”, the “fuzzy”, the “pile”, the “female”, or the “carpet”. Suitable loop materials are commercially available under the trademark VELCRO from the Velcro Industries B.V. Materials suitable for manufacturing the loop material include thermoplastics such as polypropylene, polyethylene, polyamide, polyester, polystyrene, polyvinyl chloride, acetal, acrylic, polycarbonate, polyphenylene oxide, polyurethane, polysulfone, and the like. The loop material 18 may be integrated with the support or may be attached to the support.

Alternatively, the loop material 18 can be fabricated from the same shape changing and/or flexural modulus changing materials employed for the hook elements. As such, instead of being passive, the loop material can be made active upon receipt of an activation signal. For example, both the hook elements and the loop material can be in the form of spirals, which when pressed together result in an engagement relatively strong in shear and pull-off forces and weak in peel forces. Activating the loop material 18 and hook elements 22 causes a change in shape and/or flexural modulus, thereby providing a marked reduction in shear and pull-off forces required for separation.

The supports 16 (loop portion 12) or 20 (hook portion 14) may be rigid or flexible depending on the intended application. Suitable materials for fabricating the support include plastics, fabrics, metals, and the like. For example, suitable plastics include thermoplastics such as for example polypropylene, polyethylene, polyamide, polyester, polystyrene, polyvinyl chloride, acetal, acrylic, polycarbonate, polyphenylene oxide, polyurethane, polysulfone, and other like thermoplastic polymers. An adhesive may be applied to the backside surface of the support (the surface free from the hook elements 22 or loop material) for application of the releasable fastener system to an apparatus or structure. Alternatively, the releasable fastener system 10 may be secured to an apparatus or structure by bolts, by welding, or any other mechanical securement means. It should be noted that, unlike traditional hook and loop fasteners, both supports 16, 20 could be fabricated from a rigid or inflexible material in view of the remote releasing capability provided. Traditional hook and loop fasteners typically require at least one support to be flexible so that a peeling force can be applied for separation of the hook and loop fastener.

The support 20 may also comprise the activation device 24 for providing the activating signal to the hook elements. For example, the support may be a resistance type heating block to provide a thermal energy signal sufficient to cause a shape change and/or change in flexural modulus such as may be required for hook elements fabricated from shape memory alloys, shape memory polymers, and like thermally activated materials, or the support 20 may be an electromagnet for providing a magnetic signal to hook elements fabricated from magnetostrictive materials, or the support 20 may be composed of a circuit for delivering an electrical signal to hook elements fabricated from electroactive materials, ionic polymer metal composites, electrostatic materials, piezoelectric materials, and the like. In a similar manner, if the loop material 18 is fabricated from the same materials as the hook elements 22, then support 16 may also comprise the activation device 24 for providing the activating signal to the loop material 18.

The changes in shape, dimension, and/or flexural modulus properties can be effected by employing the shape memory property and/or super-elasticity property of the particular active material. For example, shape memory alloys generally have the ability to return to a predetermined shape when heated to a temperature at or above a transformation temperature. When a shape memory alloy is below its transformation temperature, the alloy has a significantly reduced yield strength (by a factor of about 2 or about 3) and can be readily deformed into any new shape. However, when the material is heated above its transformation temperature the shape memory alloy undergoes a change in crystal structure that causes it to return to its original shape. The temperature at which the alloy remembers its high temperature form when heated can be adjusted by slight changes in the composition of the alloy and through heat treatment. In nickel titanium (NiTi) shape memory alloys, for instance, it can be changed from above about 100° C. to below about −100° C. The shape recovery process occurs over a range of just a few degrees and the start or finish of the transformation can be controlled to within a degree or two depending on the desired application.

In one embodiment, the hook portion comprises a surface that contains an array of hook elements fabricated from the active material. The so-formed hook elements are perpendicularly oriented to the surface and have a hook-like shape, dimension,. The loop material comprises a surface that contains loops or piles of material. Alternatively, as previously discussed, the loop material can be fabricated from active material configured with a similar geometry and function to those on the hook portion to which the loop material surface is to be attached, e.g., both hook elements and loop materials may comprise spiral shaped geometries that can become engaged when the two portions are pressed together. The arrays of hook elements of various geometries and/or loops on the two surfaces are to be so arranged and sufficiently dense such that the action of pressing the two surfaces together results in the mechanical engagement of the hook elements with the loop material creating a joint that is strong in shear and pull-off forces, and relatively weak in peel. Remote disengagement of the two surfaces can be effected variously changing the shape memory property by an applied or discontinued activation signal. In this manner, changing the shape, dimension, and/or flexural modulus properties of the hook elements can be used to provide reversible on-demand lockdown of the closure.

Figure 4:
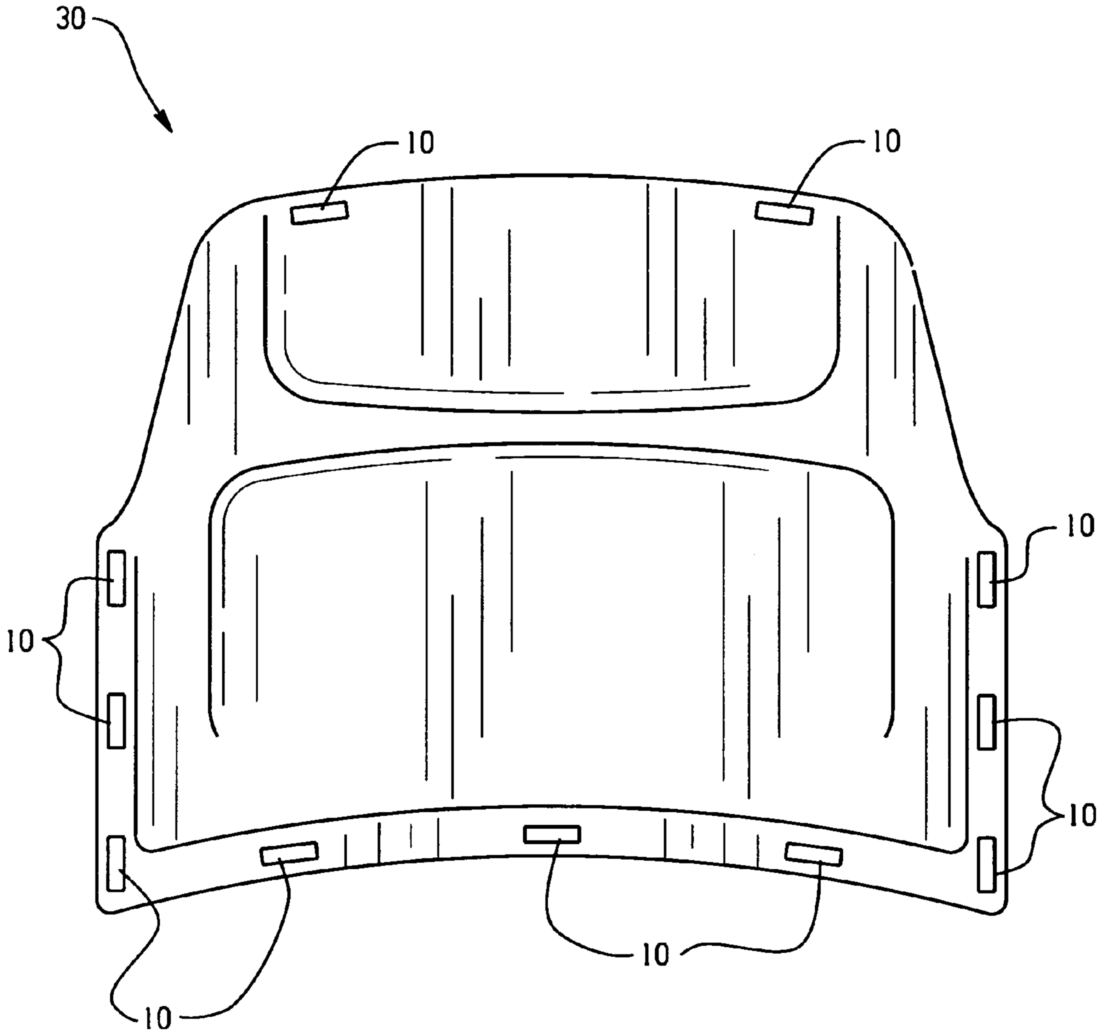
FIG. 4 is an underside plan view of a hood.

As shown in FIG. 4, various lockdown regions can be affixed to a closure such as, for example, on an underside of a hood 30, within a door frame (not shown), or the like, e.g., trunk lid, tailgate, liftgate, sunroof, etc. Depending on the device 10, a corresponding hook or loop portion would be attached to the vehicle structure such that closure of the hood would cause contact of opposing hook and loop surfaces between the hood and vehicle structure. The exact positioning of the pads will depend on the energy absorption and/or stiffness enhancement properties desired for the intended application. Although reference is made to the underside of the hood 30, it is contemplated that the active based devices could be attached to the vehicle structure (not shown) upon which the closure rests and is hinged thereto or alternatively form the hinges themselves. Again, as previously noted, various active based device configurations that can be used directly or indirectly (as actuators) to produce physical engagement of the closure with the vehicle structure, e.g., springs, latches, strips, and the like, which can be utilized to provide lockdown as will be apparent to those in the art in view of this disclosure.

Figure 5:
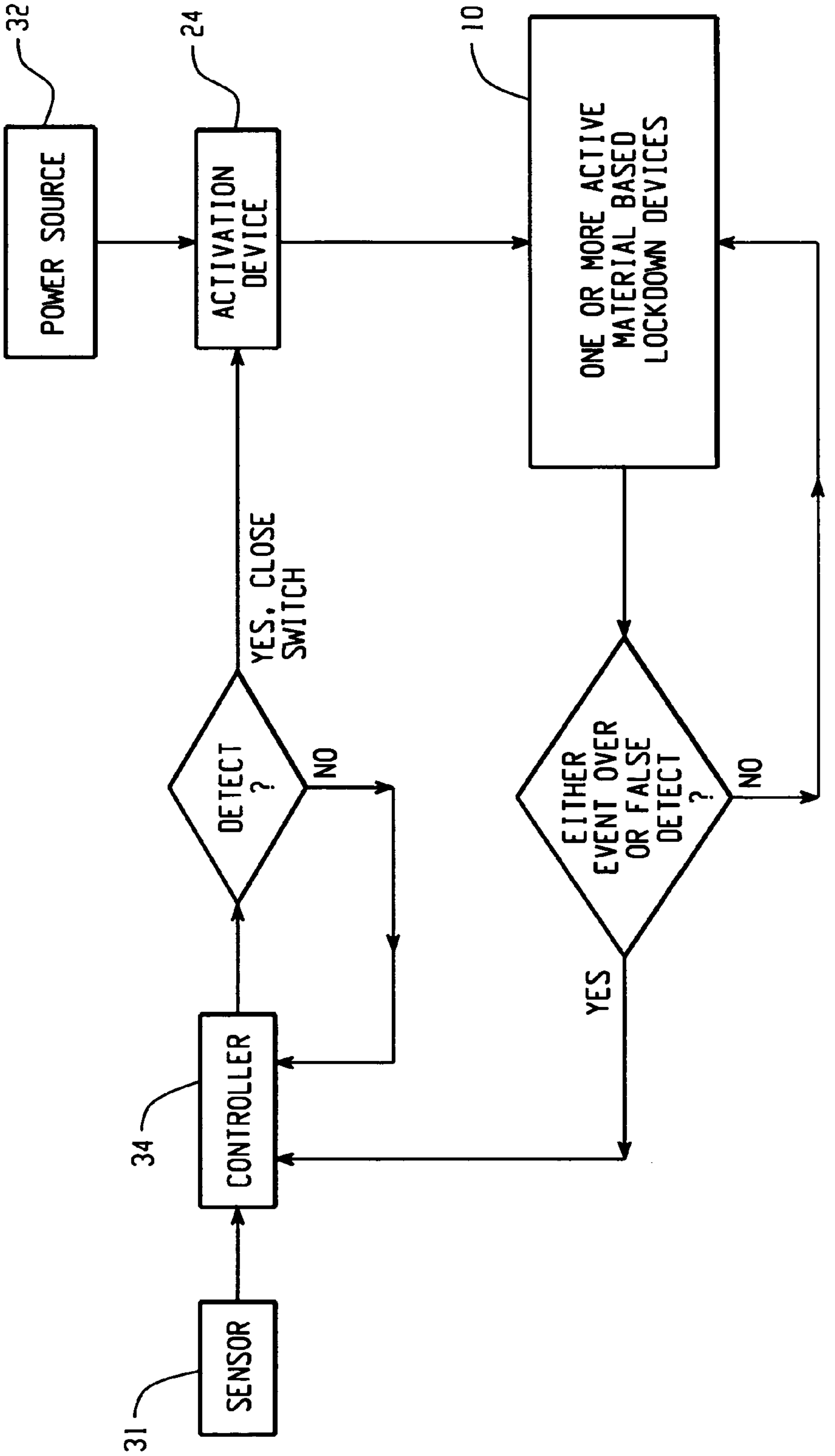
FIG. 5 is a block diagram showing illustrating a closure lock down system.

Common elements for an exemplary closure lockdown system employing the active based material devices are illustrated in FIG. 5. Such elements include a sensor 31, e.g., an impact or pre-impact sensor, in operative communication with the activation device 24 for triggering the one or more active material based lockdown devices 10 and a power source 32. In a preferred mode of operation, the lockdown devices 10 are unpowered during normal driving and are activated or powered when triggered by an output signal from the activation device 24 based on input to it from an impact or pre-impact sensor 31. Such a mechanism would remain activated through the impact event but then automatically be deactivated upon the conclusion of the impact. The sensor 30 is preferably configured to provide pre-impact information to a controller 34, which then actuates the active material using an open/closed switch (i.e., activation device 24) under pre-programmed conditions defined by an algorithm or the like. In an alternative embodiment, the mechanism would be deactivated upon a timer timing out, which would be useful in the case of a false detect. Alternatively, the zero power hold can be manually activated as may be desired for some embodiments.

As previously described, suitable active materials include, without limitation, shape memory alloys (SMA), shape memory polymers (SMP), piezoelectric materials, electroactive polymers (EAP), ferromagnetics, magnetorheological fluids and elastomers (MR), and electrorheological fluids (ER).

Suitable shape memory alloys can exhibit a one-way shape memory effect, an intrinsic two-way effect, or an extrinsic two-way shape memory effect depending on the alloy composition and processing history. The two phases that occur in shape memory alloys are often referred to as martensite and austenite phases. The martensite phase is a relatively soft and more easily deformable phase of the shape memory alloys, which generally exists at lower temperatures. The austenite phase, the higher modulus phase of the shape memory alloys, occurs at higher temperatures. Shape memory materials formed from shape memory alloy compositions that exhibit one-way shape memory effects do not automatically reform, and depending on the shape memory material design, will likely require an external mechanical force to reform the shape, dimension, that was previously exhibited, e.g., slamming of the hood, use of the built-in biasing spring, or the like. Shape memory materials that exhibit an intrinsic shape memory effect are fabricated from a shape memory alloy composition that will automatically reform themselves.

The temperature at which the shape memory alloy remembers its high temperature form when heated can be adjusted by slight changes in the composition of the alloy and through heat treatment. In nickel-titanium shape memory alloys, for example, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing the active material 14 with shape memory effects as well as high damping capacity. The inherent high damping capacity of the shape memory alloys can be used to further increase the energy absorbing properties.

Suitable shape memory alloy materials include without limitation nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-platinum based alloys, iron-palladium based alloys, and the like. The alloys can be binary, ternary, or any higher order so long as the alloy composition exhibits a shape memory effect, e.g., change in shape, dimension, damping capacity, and the like. For example, a nickel-titanium based alloy is commercially available under the trademark NITINOL from Shape Memory Applications, Inc.

Other suitable active materials are shape memory polymers. Similar to the behavior of a shape memory alloy, when the temperature is raised through its transition temperature, the shape memory polymer also undergoes a change in shape, dimension,. To set the permanent shape of the shape memory polymer, the polymer must be at about or above the Tg or melting point of the hard segment of the polymer. "Segment" refers to a block or sequence of polymer forming part of the shape memory polymer. The shape memory polymers are shaped at the temperature with an applied force followed by cooling to set the permanent shape. The temperature necessary to set the permanent shape is preferably between about 100° C. to about 300° C. Setting the temporary shape of the shape memory polymer requires the shape memory polymer material to be brought to a temperature at or above the Tg or transition temperature of the soft segment, but below the Tg or melting point of the hard segment. At the soft segment transition temperature (also termed "first transition temperature"), the temporary shape of the shape memory polymer is set followed by cooling of the shape memory polymer to lock in the temporary shape. The temporary shape is maintained as long as it remains below the soft segment transition temperature. The permanent shape is regained when the shape memory polymer fibers are once again brought to or above the transition temperature of the soft segment. Repeating the heating, shaping, and cooling steps can reset the temporary shape. The soft segment transition temperature can be chosen for a particular application by modifying the structure and composition of the polymer. Transition temperatures of the soft segment range from about −63° C. to above about 120° C.

Shape memory polymers may contain more than two transition temperatures. A shape memory polymer composition comprising a hard segment and two soft segments can have three transition temperatures: the highest transition temperature for the hard segment and a transition temperature for each soft segment.

Most shape memory polymers exhibit a "one-way" effect, wherein the shape memory polymer exhibits one permanent shape. Upon heating the shape memory polymer above the first transition temperature, the permanent shape is achieved and the shape will not revert back to the temporary shape without the use of outside forces. As an alternative, some shape memory polymer compositions can be prepared to exhibit a "two-way" effect. These systems consist of at least two polymer components. For example, one component could be a first cross-linked polymer while the other component is a different cross-linked polymer. The components are combined by layer techniques, or are interpenetrating networks, wherein two components are cross-linked but not to each other. By changing the temperature, the shape memory polymer changes its shape in the direction of the first permanent shape to the second permanent shape. Each of the permanent shapes belongs to one component of the shape memory polymer. The two permanent shapes are always in equilibrium between both shapes. The temperature dependence of the shape is caused by the fact that the mechanical properties of one component ("component A") are almost independent from the temperature in the temperature interval of interest. The mechanical properties of the other component ("component B") depend on the temperature. In one embodiment, component B becomes stronger at low temperatures compared to component A, while component A is stronger at high temperatures and determines the actual shape. A two-way memory device can be prepared by setting the permanent shape of component A ("first permanent shape"); deforming the device into the permanent shape of component B ("second permanent shape") and fixing the permanent shape of component B while applying a stress to the component.

Similar to the shape memory alloy materials, the shape memory polymers can be configured in many different forms and shapes. The temperature needed for permanent shape recovery can be set at any temperature between about −63° C. and about 120° C. or above. Engineering the composition and structure of the polymer itself can allow for the choice of a particular temperature for a desired application. A preferred temperature for shape recovery is greater than or equal to about −30° C., more preferably greater than or equal to about 0° C., and most preferably a temperature greater than or equal to about 50° C. Also, a preferred temperature for shape recovery is less than or equal to about 120° C., more preferably less than or equal to about 90° C., and most preferably less than or equal to about 70° C.

Suitable shape memory polymers include thermoplastics, thermosets, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acid)s, polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methacrylate), poly(ethyl methacrylate), ply(butyl methacrylate), poly (isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecyl acrylate). Examples of other suitable polymers include polystyrene, polypropylene, polyvinyl phenol, polyvinylpyrrolidone, chlorinated polybutylene, poly(octadecyl vinyl ether)ethylene vinyl acetate, polyethylene, poly(ethylene oxide)-poly (ethylene terephthalate), polyethylene/nylon (graft copolymer), polycaprolactones-polyamide (block copolymer), poly (caprolactone) dimethacrylate-n-butyl acrylate, poly (norbornyl-polyhedral oligomeric silsequioxane), polyvinylchloride, urethane/butadiene copolymers, polyurethane block copolymers, styrene-butadiene-styrene block copolymers, and the like.

The shape memory polymer or the shape memory alloy, may be activated by any suitable means, preferably a means for subjecting the material to a temperature change above, or below, a transition temperature. For example, for elevated temperatures, heat may be supplied using hot gas (e.g., air), steam, hot liquid, or electrical current. The activation means may, for example, be in the form of heat conduction from a heated element in contact with the shape memory material, heat convection from a heated conduit in proximity to the thermally active shape memory material, a hot air blower or jet, microwave interaction, resistive heating, and the like. In the case of a temperature drop, heat may be extracted by using cold gas, or evaporation of a refrigerant. The activation means may, for example, be in the form of a cool room or enclosure, a cooling probe having a cooled tip, a control signal to a thermoelectric unit, a cold air blower or jet, or means for introducing a refrigerant (such as liquid nitrogen) to at least the vicinity of the shape memory material.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. The materials generally employ the use of compliant electrodes that enable polymer films to expand or contract in the in-plane directions in response to applied electric fields or mechanical stresses. An example of an electrostrictive-grafted elastomer is a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator. Activation of an EAP based pad preferably utilizes an electrical signal to provide change in shape, dimension, sufficient to provide displacement. Reversing the polarity of the applied voltage to the EAP can provide a reversible lockdown mechanism.

Materials suitable for use as the electroactive polymer may include any substantially insulating polymer or rubber (or combination thereof) that deforms in response to an electrostatic force or whose deformation results in a change in electric field. Exemplary materials suitable for use as a pre- strained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present disclosure may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

The active material may also comprise a piezoelectric material. Also, in certain embodiments, the piezoelectric material may be configured as an actuator for providing rapid deployment. As used herein, the term "piezoelectric" is used to describe a material that mechanically deforms (changes shape) when a voltage potential is applied, or conversely, generates an electrical charge when mechanically deformed. Preferably, the piezoelectric material is disposed on strips of a flexible metal or ceramic sheet. The strips can be unimorph or bimorph. Preferably, the strips are bimorph, because bimorphs generally exhibit more displacement than unimorphs. Employing the piezoelectric material will utilize an electrical signal for activation. Upon activation, the piezoelectric material will assume an arcuate shape, thereby causing displacement in the powered state. Upon discontinuation of the activation signal, the strips will assume its original shape, dimension, e.g., a straightened shape, dimension.

One type of unimorph is a structure composed of a single piezoelectric element externally bonded to a flexible metal foil or strip, which is stimulated by the piezoelectric element when activated with a changing voltage and results in an axial buckling or deflection as it opposes the movement of the piezoelectric element. The actuator movement for a unimorph can be by contraction or expansion. Unimorphs can exhibit a strain of as high as about 10%, but generally can only sustain low loads relative to the overall dimensions of the unimorph structure. A commercial example of a pre-stressed unimorph is referred to as "THUNDER", which is an acronym for THin layer composite UNimorph ferroelectric Driver and sEnsoR. THUNDER is a composite structure constructed with a piezoelectric ceramic layer (for example, lead zirconate titanate), which is electroplated on its two major faces. A metal pre-stress layer is adhered to the electroplated surface on at least one side of the ceramic layer by an adhesive layer (for example, "LaRC-SI®" developed by the National Aeronautics and Space Administration (NASA)). During manufacture of a THUNDER actuator, the ceramic layer, the adhesive layer, and the first pre-stress layer are simultaneously heated to a temperature above the melting point of the adhesive, and then subsequently allowed to cool, thereby re-solidifying and setting the adhesive layer. During the cooling process the ceramic layer becomes strained, due to the higher coefficients of thermal contraction of the metal pre-stress layer and the adhesive layer than of the ceramic layer. Also, due to the greater thermal contraction of the laminate materials than the ceramic layer, the ceramic layer deforms into an arcuate shape having a generally concave face.

In contrast to the unimorph piezoelectric device, a bimorph device includes an intermediate flexible metal foil sandwiched between two piezoelectric elements. Bimorphs exhibit more displacement than unimorphs because under the applied voltage one ceramic element will contract while the other expands. Bimorphs can exhibit strains up to about 20%, but similar to unimorphs, generally cannot sustain high loads relative to the overall dimensions of the unimorph structure.

Suitable piezoelectric materials include inorganic compounds, organic compounds, and metals. With regard to organic materials, all of the polymeric materials with non-centrosymmetric structure and large dipole moment group(s) on the main chain or on the side-chain, or on both chains within the molecules, can be used as candidates for the piezoelectric film. Examples of suitable polymers include, for example, but are not limited to, poly(sodium 4-styrenesulfonate) ("PSS"), poly S-119 (poly(vinylamine) backbone azo chromophore), and their derivatives; polyfluorocarbons, including polyvinylidene fluoride ("PVDF"), its co-polymer vinylidene fluoride ("VDF"), trifluoroethylene (TrFE), and their derivatives; polychlorocarbons, including poly(vinyl chloride) ("PVC"), polyvinylidene chloride ("PVDC"), and their derivatives; polyacrylonitriles ("PAN"), and their derivatives; polycarboxylic acids, including poly(methacrylic acid ("PMA"), and their derivatives; polyureas, and their derivatives; polyurethanes ("PU"), and their derivatives; bio-polymer molecules such as poly-L-lactic acids and their derivatives, and membrane proteins, as well as phosphate bio-molecules; polyanilines and their derivatives, and all of the derivatives of tetramines; polyimides, including Kapton molecules and polyetherimide ("PEI"), and their derivatives; all of the membrane polymers; poly(N-vinyl pyrrolidone) ("PVP") homopolymer, and its derivatives, and random PVP-co-vinyl acetate ("PVAc") copolymers; and all of the aromatic polymers with dipole moment groups in the main-chain or side-chains, or in both the main-chain and the side-chains, and mixtures thereof.

Further, piezoelectric materials can include Pt, Pd, Ni, Ti, Cr, Fe, Ag, Au, Cu, and metal alloys and mixtures thereof. These piezoelectric materials can also include, for example, metal oxide such as $SiO_2$, $Al_2O_3$, $ZrO_2$, $TiO_2$, $SrTiO_3$, $PbTiO_3$, $BaTiO_3$, $FeO_3$, $Fe_3O_4$, ZnO, and mixtures thereof; and Group VIA and IIB compounds, such as CdSe, CdS, GaAs, AgCaSe 2, ZnSe, GaP, InP, ZnS, and mixtures thereof.

The action of the active material in an impact mitigation mechanism may be used either directly or indirectly to either reversibly or irreversibly change the applied load needed to globally displace the hood (for example by changing the stroking force in ER and MR material hood mounts, attachments or lifters or by changing the stiffness of supporting or lifting springs or hook elements made of shape memory alloys, and the like).

In some embodiments, the functionality is not provided entirely by the active material. In general, an active material is used to provide at least one, but not necessarily all of the following functions: changes in stiffiess, actuation, impact energy absorption and the tailorability thereof, and a self-healing or reversibility of the mechanism.

As previously discussed, the various shapes of the shape memory material 14 employed in the energy absorbing assemblies 11 are virtually limitless. Suitable geometrical arrangements may include cellular metal textiles, open cell foam structures, multiple layers of shape memory material similar to “bubble wrap”, arrays of hooks and/or loops, and the like.

The activation times will generally vary depending on the intended application, the particular active material employed, the magnitude of the activation signal, and the like. For example, for hood and trunk lockdowns, if crash triggered it is generally preferred to have an activation time of less than about 10 milliseconds, an activation time of less than 5 milliseconds more preferred for some applications, an activation time of less than 3 milliseconds even more preferred for other applications, and an activation time of less than 0.5 milliseconds for still other applications. For door lockdown, if done automatically upon door closure, it is preferred to have an activation time less than about 1 second, with an activation time of less than about 0.5 seconds more preferred.

Advantageously, the hood assemblies utilizing the active materials to effect changes in energy absorption properties provides a relatively robust system compared to conventional systems utilizing stroking mechanisms based on hydraulics, and the like. Moreover, in addition to providing reversibility, the active material based actuators are relatively compact and have significantly lower weight. It should be recognized by those skilled in the art that the active materials as used herein allows the use of pre-crash sensors.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. In combination with a vehicle and a closure, one or more lockdown regions disposed between the closure and the vehicle body, the one or more lockdown regions comprising:

a device comprising an active material disposed in operative communication with the closure and the vehicle body, wherein the active material comprises a shape memory alloy, a magnetic shape memory material, a shape memory polymer, a magnetorheological fluid, an electroactive polymer, a magnetorheological elastomer, an electrorheological fluid, a piezoelectric material, or combinations comprising at least one of the foregoing active materials, wherein the one or more lockdown regions comprises a plurality of hook elements formed of the active material in a releasable pressing engagement with a loop material, wherein the hook elements are disposed on a selected one of the closure or the vehicle body, and the loop material is disposed on the other one of the closure or the vehicle body; and an activation device coupled to the active material, the activation device being operable to selectively provide an activation signal to the active material and effectuate a change in a dimension, a shape, and/or a flexural modulus property of the active material, wherein the change in the dimension, a shape, and/or flexural modulus of the active material locks down or releases the closure from the vehicle.

2. The one or more lockdown regions of claim 1, wherein the one or more lockdown regions comprise a spring formed of the active material.

3. The one or more lockdown regions of claim 1, wherein the one or more lockdown regions comprise a strip formed of the active material.

4. The one or more lockdown regions of claim 1, wherein the activation signal comprises a thermal activation signal, a magnetic activation signal, an electric activation signal, a chemical activation signal, a mechanical load, or a combination comprising at least one of the foregoing activation signals.

5. The one or more lockdown regions of claim 1, wherein the closure comprises a door, hood, tailgate, liftgate, an engine lid, a sunroof, or a trunk lid.

6. A reversible lockdown system for a closure hingeably attached to a vehicle body, comprising:

a sensor that generates a signal based on pre-impact or impact information;

a controller disposed to receive the sensor signal and deliver an activation signal to at least one device in operative communication with the closure and the vehicle body, wherein the at least one device comprises an active material disposed in operative communication with the hood and the vehicle body, wherein the active material comprises a shape memory alloy, a magnetic shape memory alloy, a shape memory polymer, a magnetorheological fluid, an electroactive polymer, a magnetorheological elastomer, an electrorheological fluid, a piezoelectric material, or combinations comprising at least one of the foregoing active materials, and wherein the activation signal effectuates a change in a shape, dimension, and/or flexural modulus property of the active material, wherein the change in the shape, dimension, and/or flexural modulus of the active material locks down or releases the closure from the vehicle.

7. The reversible lockdown system of claim 6, wherein the at least one device comprises a plurality of hook elements formed of the active material in a releasable pressing engagement with a loop material, wherein the hook elements are disposed on a selected one of the closure or the vehicle body, and the loop material is disposed on the other one of the closure or the vehicle body.

8. The reversible lockdown system of claim 6, wherein the at least one device comprises a spring formed of the active material.

9. The reversible lockdown system of claim 6, wherein the at least one device comprises a strip formed of the active material, wherein the strip is intermediate the closure and the vehicle body.

10. The reversible lockdown system of claim 6, wherein the activation signal comprises a thermal activation signal, a magnetic activation signal, an electric activation signal, a chemical activation signal, a mechanical load, or a combination comprising at least one of the foregoing activation signals.

11. The reversible lockdown system of claim 6, wherein the closure comprises a door, a hood, a tailgate, a liftgate, an engine lid, a sunroof, or a trunk lid.

12. The reversible lockdown system of claim 6, wherein the controller is further adapted to receive a manual signal and deliver the activation signal to the at least one device in operative communication with the closure and the vehicle body.

13. A method for selectively stiffening a closure hingeably attached to a vehicle body, the method comprising:

generating an activation signal, wherein generating the activation signal first comprises sensing and/or pre-sensing an impact event; and activating at least one device in response to the activation signal, wherein the at least one device comprises an active material in operable communication with a closure and vehicle body, wherein the active material changes a shape, a dimension, or flexural modulus property of the active material upon receipt of the activation signal and stiffens an interface between the closure and the vehicle body.

14. The method of claim 13, wherein the active material comprises a shape memory alloy, a shape memory polymer, a magnetorheological fluid, an electroactive polymer, a magnetorheological elastomer, an electrorheological fluid, a piezoelectric material, or combinations comprising at least one of the foregoing active materials.

15. The method according to claim 13, wherein sensing is accomplished with a pre-impact sensor.

16. The method according to claim 13, wherein sensing is accomplished with an impact sensor.

17. The method according to claim 13, wherein the generating the activation signal comprises manual activation.

18. The method according to claim 13, wherein the activation signal comprises a thermal activation signal, a magnetic activation signal, an electric activation signal, a chemical activation signal, a mechanical load, or a combination comprising at least one of the foregoing activation signals.

19. The method according to claim 13, wherein the at least one device comprises a plurality of hook elements formed of the active material in a releasable pressing engagement with a complementary positioned loop material, wherein the hook elements are disposed on a selected one of the hood or the vehicle body, and the loop material is disposed on the other one of the hood or the vehicle body.

20. The method according to claim 13, further comprising altering a load path during an impact event by generating the activation signal.

21. The method of claim 13, wherein the at least one device reversibly changes the shape, dimension, or the flexural modulus property of the active material.

22. In combination with a vehicle and a closure, one or more lockdown regions disposed between the closure and the vehicle body, the one or more lockdown regions comprising:

a device comprising an active material disposed in operative communication with the closure and the vehicle body, wherein the active material comprises a shape memory polymer, a magnetorheological fluid, an electroactive polymer, a magnetorheological elastomer, an electrorheological fluid, a piezoelectric material, or combinations comprising at least one of the foregoing active materials; and an activation device coupled to the active material, the activation device being operable to selectively provide an activation signal to the active material and effectuate a change in a dimension, a shape, and/or a flexural modulus property of the active material, wherein the change in the dimension, a shape, and/or flexural modulus of the active material locks down or releases the closure from the vehicle.

* * * * *